(12) United States Patent
Merwarth et al.

(10) Patent No.: US 7,822,503 B2
(45) Date of Patent: Oct. 26, 2010

(54) SYSTEMS, METHODS, AND APPARATUSES FOR ENERGY MANAGEMENT IN VENDING MACHINES, APPLIANCES, AND OTHER STORE OR DISPENSE EQUIPMENT

(75) Inventors: Stephen D. Merwarth, Cumming, GA (US); Steven A. Cousins, Stone Mountain, GA (US)

(73) Assignee: The Coca-Cola Company, Atlanta, GA (US)

( * ) Notice: Subject to any disclaimer, the term of this patent is extended or adjusted under 35 U.S.C. 154(b) by 321 days.

(21) Appl. No.: 11/535,727

(22) Filed: Sep. 27, 2006

(65) Prior Publication Data
US 2008/0077275 A1    Mar. 27, 2008

(51) Int. Cl.
G06F 17/00 (2006.01)
(52) U.S. Cl. .................. 700/236; 700/232; 700/295; 700/296; 700/241; 700/244
(58) Field of Classification Search ......... 700/231–244, 700/295–296
See application file for complete search history.

(56) References Cited

U.S. PATENT DOCUMENTS

| | | | | |
|---|---|---|---|---|
| 4,412,292 A * | 10/1983 | Sedam et al. | ............... | 700/241 |
| 4,417,450 A | 11/1983 | Morgan | | |
| 5,054,585 A | 10/1991 | Amano | | |
| 5,252,789 A | 10/1993 | Sirag, Jr. et al. | | |
| 5,318,224 A | 6/1994 | Darby et al. | | |
| 5,428,345 A | 6/1995 | Bruno | | |
| 5,579,993 A | 12/1996 | Ahmed et al. | | |
| 5,608,643 A * | 3/1997 | Wichter et al. | ............... | 700/244 |
| 5,714,725 A | 2/1998 | Thangavelu | | |

(Continued)

FOREIGN PATENT DOCUMENTS

WO    0143089 A    6/2001

(Continued)

OTHER PUBLICATIONS

International Search Report for PCT/US07/079488 dated Apr. 9, 2008.

(Continued)

*Primary Examiner*—Gene Crawford
*Assistant Examiner*—Michael K Collins
(74) *Attorney, Agent, or Firm*—Sutherland Asbill & Brennan LLP

(57) ABSTRACT

System, methods, and apparatuses are provided for energy management in store or dispense equipment for food and/or beverages. Such store or dispense equipment may allow for food and/or beverages to be heated, cooled, or maintained near the ambient temperature, or a combination thereof. Demand data may be retrieved from the store or dispense equipment. Demand data may include sales, usage, and/or occupancy information for the respective vending machines, appliances, coolers, dispensers, and other store or dispense equipment. This demand data may then analyzed to determine whether there are demand patterns such that there are opportunities for energy conservation or energy management. If there are opportunities for energy conservation or energy management, an instruction set may be prepared, where the instruction set is based at least in part on this analyzed data. The instruction set is loaded onto the store or dispense equipment, which operates in accordance with the instruction set.

48 Claims, 6 Drawing Sheets

U.S. PATENT DOCUMENTS

| | | |
|---|---|---|
| 5,750,946 A | 5/1998 | Thangavelu |
| 5,769,314 A | 6/1998 | Drees et al. |
| 5,822,740 A | 10/1998 | Haissig et al. |
| 5,841,084 A | 11/1998 | Thangavelu |
| 6,055,820 A | 5/2000 | Jeong et al. |
| 6,078,856 A | 6/2000 | Malson |
| 6,141,570 A | 10/2000 | O'Neill, Jr. et al. |
| 6,151,529 A | 11/2000 | Batko |
| 6,166,627 A | 12/2000 | Reeley |
| 6,205,439 B1 | 3/2001 | Gardner |
| 6,243,548 B1 | 6/2001 | Hebert et al. |
| 6,243,626 B1 | 6/2001 | Schanin |
| 6,341,252 B1 | 1/2002 | Foo et al. |
| 6,581,396 B2 * | 6/2003 | Schanin ............ 62/180 |
| 6,745,581 B2 * | 6/2004 | King et al. ............ 62/131 |
| 6,874,691 B1 | 4/2005 | Hildebrand et al. |
| 6,898,942 B2 * | 5/2005 | Schanin ............ 62/158 |
| 6,975,926 B2 | 12/2005 | Schanin |
| 7,167,892 B2 * | 1/2007 | Defosse et al. ............ 709/200 |
| 2004/0050075 A1 | 3/2004 | King et al. |
| 2004/0249711 A1 * | 12/2004 | Walker et al. ............ 705/14 |
| 2005/0177282 A1 * | 8/2005 | Mason, II ............ 700/300 |
| 2006/0122738 A1 * | 6/2006 | Yamada et al. ............ 700/295 |
| 2006/0289553 A1 * | 12/2006 | Ehlers et al. ............ 221/9 |
| 2007/0051744 A1 * | 3/2007 | Tam et al. ............ 221/259 |
| 2007/0136125 A1 * | 6/2007 | Godwin et al. ............ 705/10 |
| 2008/0051934 A1 * | 2/2008 | Tedesco et al. ............ 700/236 |

FOREIGN PATENT DOCUMENTS

| | | |
|---|---|---|
| WO | 01/90668 | 11/2001 |
| WO | 0190668 A | 11/2001 |

OTHER PUBLICATIONS

International Preliminary Report on Patentability for International Application No. PCT/US2007/079488 dated Apr. 3, 2009.

* cited by examiner

FIG. 3A

| | 0:00 | 1:00 | 2:00 | 3:00 | 4:00 | 5:00 | 6:00 | 7:00 | 8:00 | 9:00 | 10:00 | 11:00 | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|---|---|---|---|---|---|---|---|---|---|---|---|
| Monday | 2 | 2 | 2 | 2& | 2& | 2& | 2 | 2 | 1# | 1# | 1# | 0# | 0# | 0# | 0# | 1# | 1 | 1 | 0# | 0# | 1# | 1# | 2 | 2 |
| Tuesday | 2 | 2 | 2 | 2& | 2& | 2& | 2 | 2 | 1# | 1# | 1# | 0# | 0# | 0# | 0# | 1# | 1 | 1 | 0# | 0# | 0# | 0# | 2 | 0# |
| Wednesday | 2 | 2 | 2 | 2& | 2& | 2& | 2 | 2 | 1# | 1# | 1# | 0# | 0# | 0# | 0# | 1# | 1 | 0# | 0# | 0# | 0# | 0# | 2 | 2 |
| Thursday | 2 | 2 | 2 | 2& | 2& | 2& | 2 | 2 | 1# | 1# | 1# | 0# | 0# | 0# | 0# | 1# | 1# | 0# | 0# | 0# | 2 | 1# | 1# | 1# |
| Friday | 2 | 2 | 2 | 2& | 2& | 2& | 2 | 2 | 1# | 1# | 1# | 1# | 1# | 1# | 1# | 1 | 1 | 1# | 0# | 1& | 1& | 1& | 1 | 1 |
| Saturday | 0# | 0# | 1 | 2 | 2 | 2 | 2 | 2 | 2 | 2 | 2 | 2 | 2 | 2 | 2 | 2 | 2 | 1 | 1# | 1# | 1# | 1# | 1# | 2 |
| Sunday | 0# | 0# | 2 | 2 | 2 | 2 | 2& | 2 | 2 | 2 | 2 | 2 | 2 | 2 | 2 | 2 | 2 | 0# | 0# | 1# | 1# | 2 | 2 | 2 |

| 0 | Normal Temperature Mode |
|---|---|
| 1 | Standby Temperature Mode |
| 2 | Storage Temperature Mode |
| # | Lights On |
| & | Reverse Condenser Fan |

FIG. 3B

| | 0:00 | 1:00 | 2:00 | 3:00 | 4:00 | 5:00 | 6:00 | 7:00 | 8:00 | 9:00 | 10:00 | 11:00 | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|---|---|---|---|---|---|---|---|---|---|---|---|
| Monday | 45 | 45 | 45 | 45& | 45& | 45& | 45 | 45 | 45 | 40# | 36# | 32# | 32# | 32# | 32# | 36 | 45 | 45 | 45 | 32# | 45# | 45# | 45 | 45 |
| Tuesday | 45 | 45 | 45 | 45& | 45& | 45& | 45 | 45 | 45 | 36# | 36# | 32# | 32# | 32# | 32# | 36# | 36# | 36# | 32# | 32# | 32# | 32# | 32# | 32# |
| Wednesday | 45 | 45 | 45 | 45& | 45& | 45& | 45 | 45 | 45 | 45# | 45# | 32# | 32# | 32# | 32# | 36# | 36 | 32# | 32# | 32# | 45 | 45# | 45 | 45 |
| Thursday | 45 | 45 | 45 | 45& | 45& | 45& | 45 | 45 | 45 | 45# | 45# | 32# | 32# | 32# | 32# | 36# | 36# | 36# | 32# | 32# | 45# | 45# | 45 | 45 |
| Friday | 45 | 45 | 45 | 45& | 45& | 45& | 45 | 45 | 45 | 45 | 45 | 45# | 45# | 45# | 45# | 36 | 32# | 32# | 32# | 45& | 36& | 36# | 32# | 32# |
| Saturday | 32# | 32# | 45 | 45 | 45 | 45 | 45 | 45 | 45 | 45 | 45 | 45 | 45 | 45 | 36 | 32# | 32# | 45 | 45& | 45& | 45& | 45& | 45 | 45 |
| Sunday | 32# | 32# | 45 | 45 | 45 | 45 | 45& | 45 | 45 | 45 | 45 | 45 | 45 | 45 | 36 | 32# | 32# | 32# | 36# | 36# | 36# | 36 | 45 | 45 |

| # | Lights On |
|---|---|
| & | Reverse Condenser Fan |

SYSTEMS, METHODS, AND APPARATUSES FOR ENERGY MANAGEMENT IN VENDING MACHINES, APPLIANCES, AND OTHER STORE OR DISPENSE EQUIPMENT

BACKGROUND OF THE INVENTION

I. Field of the Invention

The present invention relates generally to energy management, and more particularly, to energy management of vending machines, appliances, coolers. dispensers, and other electrical equipment for storing and dispensing food and/or beverages.

II. Description of Related Art

Vending machines provide cost-effective delivery of beverages or other products to consumers in outlets, retail stores, office buildings, and other public distribution points (hereafter collectively referred to as "outlets"). These vending machines utilize cooling and heating devices to maintain or serve the beverages or other products at a dispensing temperature different from the ambient temperature. The cooling devices typically include a compressor to compress a refrigerant and an evaporator to evaporate the refrigerant, as is well-known to those of ordinary skill in art. The heating devices typically include resistive heating elements or microwave systems, as is well known to those of ordinary skill in art. In addition, these vending machines typically also utilize lighting equipment to advertise the beverages or other products to the consumers.

These vending machines require energy during operation so it is desirable that the beverage for sale be maintained at an optimum serving temperature usually different from the ambient temperature during business hours, and maintained closer to the ambient temperature during non-business hours to conserve energy. Similarly, it is also desirable to conserve energy by dimming or turning off the lighting equipment during non-business hours. Accordingly, by not requiring beverages to be at optimum serving temperature and dimming or turning off lighting equipment during non-business hours, the retailer experiences lower energy expenditures for the vending machine.

One technique to vary the vending machine's temperature and lighting equipment is through the use of preset adjustments. Preset adjustments are stored in the vending machine and must be maintained over time. However, as vending machines are moved from outlet to outlet, perhaps for redeployment from lost accounts, or as the business hours at an outlet change, the preset times are usually not maintained. In addition, while bottler service technicians and/or route drivers are generally the only people in a position to reprogram the preset adjustments, there are oftentimes not any incentives for them to do so. In any event, these preset adjustments are inherently flawed because they do not properly account for demand variations during the business hours of the outlet store from day to day or during any given day of the week.

Thus, there exists m unsatisfied need in the industry for maximizing energy efficiency by accounting for consumer demand patterns during a day.

SUMMARY OF THE INVENTION

The present invention provides systems, methods, and apparatuses for energy management in store or dispense equipment for food and/or beverages. Such store or dispense equipment may allow for food and/or beverages to be heated, cooled, or maintained near the ambient temperature, or a combination thereof. The store or dispense equipment may include vending machines, appliances, coolers, dispensers such as food dispensers and beverage dispensers (e.g., a fountain drink system), and other like electrical equipment. In accordance with an embodiment of the present invention, some store or dispense equipment may perform both the functions of storing and dispensing, including the vending machines and dispensers described above. Demand data may be retrieved from the vending machine, appliance, cooler, dispenser, or other store or dispense equipment. Demand data may include sales, usage, and/or occupancy information for the respective vending machines, appliances, coolers, dispensers, and other store or dispense equipment. This demand data may then analyzed to determine whether there are demand patterns such that there are opportunities for energy conservation or energy management. If there are opportunities for energy conservation or energy management, an instruction set may be prepared, where the instruction set is based at least in part on this analyzed data. The instruction set is loaded onto the vending machine, appliance, or other equipment, which operates in accordance with the instruction set. While the following embodiments of the present invention may be discussed with respect to a vending machine for illustrative purposes, they are equally applicable to appliances, coolers, dispensers, and other store or dispense equipment.

According to an embodiment of the present invention, there is a method for providing energy management functionality for store or dispense equipment for food or beverages. The method includes retrieving demand data from the store or dispense equipment, where the demand data includes usage information associated with the store or dispense equipment, analyzing the demand data, and preparing an instruction set for the store or dispense equipment, where the instruction set is based at least in part on the analyzed demand data. The method further includes loading the instruction set onto the store or dispense equipment, where the store or dispense equipment operates, at least in part, according to the instruction set.

According to an aspect of the present invention, the demand data may include information associated with products dispensed from the store or dispense equipment. According to another aspect of the present invention, retrieving demand data may include retrieving sales information provided by a sensor of the store or dispense equipment. According to yet another aspect of the present invention, loading the instruction set may include loading the instruction set onto a retrofit audit device associated with the store or dispense equipment. The method may further include generating instructions by the retrofit audit device and transmitting the instructions to a controller of the store or dispense equipment, where the instructions may be based at least in part on the loaded instruction set. According to another aspect of the present invention, preparing an instruction set includes preparing the instruction set that specifies one or more user-settable options of the store or dispense equipment. According to still another aspect of the present invention, preparing an instruction set may include preparing the instruction set based at least in part on input from at least one of an merchant-owner, a route supervisor, and a bottler associated with the store or dispense equipment.

According to another aspect of the present invention, retrieving demand data may include retrieving information provided by a motion sensor of the store or dispense equipment. Retrieving demand data from the store or dispense equipment may also include retrieving demand data directly from a controller of the store or dispense equipment. Retrieving data may also involve retrieving the demand data via a network. The network may include at least one of a wired network, a wireless network, and a portable device. According to still another aspect of the present invention, loading the instruction set may include loading the instruction set into a controller of the store or dispense equipment. According to yet another aspect of the present invention, preparing the instruction set may include preparing the instruction set that specifies at least one time period and at least one mode of operation or configuration for at least one component of the store or dispense equipment during the at least one time period. The mode of operation or configuration may include a normal mode, a standby mode, and a storage mode for at least one component of the store or dispense equipment. The mode of operation of configuration may also include at least one temperature for at least one component of the store or dispense equipment. The at least one component of the electrical equipment may include one or more of lighting equipment, a refrigeration system component, a controller, or a heating system component. The refrigeration system component may include one or more of a compressor fan or an evaporator fan.

According to another aspect of the present invention, preparing an instruction set may include preparing the instruction set that specifies a plurality of time periods and a plurality of prices for the time periods, where at least two prices may be associated with at least one product of the store or dispense equipment. According to yet another aspect of the present invention, preparing an instruction set may include preparing the instruction set that specifies at least one time period and a mode of operation or configuration for at least one media presentation during the time period. The media presentation may be associated with an advertisement. The media presentation may also include an interactive media presentation. According to yet another aspect of the present invention, the store or dispense equipment may include a condenser fan, and preparing an instruction set may include preparing the instruction set that specifies at least one time period and a reverse mode of operation or configuration for the condenser fan for at least one time period. According to still another aspect of the present invention, the store or dispense equipment may include a condenser fan and a compressor, and preparing an instruction set includes preparing an instruction set for at least one of the condenser fan and the compressor, and a reverse mode of operation for the condenser fan may be independent of an operation of the compressor.

According to another embodiment of the present invention, there is a system for providing energy management for store or dispense equipment for food or beverages. The system includes at least one store or dispense equipment, where the store or dispense equipment stores demand data for products provided by the store or dispense equipment, and a processing center where the processing center may be operative to analyze the stored data to identify time periods for energy conservation, and generate an instruction set for the at least one store or dispense equipment based at least in part on the identified time periods for energy conservation.

According to an aspect of the present invention, the system may further include a communication module of the store or dispense equipment, where the communication module transmits the demand data to the processing center over a network and where the communication nodule receives the instruction set from the processing center over the network. The network may include at least one of a wired network, a wireless network, and a portable device. The portable device may retrieve the stored data from the store or dispense equipment and communicate the stored data to the processing center. According to another aspect of the present invention, the instruction set may specify at least one time period and at least one mode of operation or configuration for at least one component of the store or dispense equipment during the time period. The at least one component may include at least one of lighting equipment, a refrigeration system component, vending machine controller, and a heating system component. According to another aspect of the present invention, the instruction set my specify a plurality of time periods and a plurality of prices for the time periods, where at least two prices are associated with at least one product of the store or dispense equipment. According to another aspect of the present invention, the system may further include an override switch or manual mode for the store or dispense equipment, where the override switch or manual mode may supercede one or more specifications of the instruction set. According to another aspect of the present invention, the instruction set may specify one or more user-settable options of the store or dispense equipment. According to yet another aspect of the present invention, the instruction set may specify at least one time period and a mode of operation or configuration for at least one media presentation during the time period. The media presentation may be associated with an advertisement. The method presentation may also be an interactive media presentation.

According to yet another embodiment of the present invention, there is an apparatus configurable for energy management. The appliance includes a processor, where the processor executes control instructions for controlling operations of one or more electrical components of an appliance, a first memory in communication with the processor for storing demand data associated with the appliance, and a first communication module for transmitting the demand data to a processing center. The apparatus further includes a second communication module for receiving an instruction set based at least in part on the transmitted demand data, a second memory in communication with the processor for storing the received instruction set, and an energy management agent module operative with the instruction set to provide control instructions to the processor for execution.

According to an aspect of the present invention, the appliance may include at least one of a vending machine, a dispenser, a merchandiser, an oven, or a refrigerator. According to another aspect of the present invention, the instruction set may specify one or more user-settable options of the vending machine. According to another aspect of the present invention, the instructions set may specify a plurality of time periods and a plurality of prices for the time periods, where at least two prices may be associated with at least one product of the vending machine. According to yet another aspect of the present invention, the one or more electrical components may include one or more of lighting equipment, refrigeration equipment, and heating equipment. According to still another aspect of the present invention, the instruction set may specify at least one time period and at least one mode of operation or configuration for at least one component of the appliance. According to another aspect of the present invention, the instruction set may specify at least one time period and a mode of operation or configuration for at least one media presentation during the time period. The media presentation may be associated with an advertisement. The media presentation may also include an interactive media presentation. According to yet another aspect of the present invention, the first communication module and the second communication module may be provided in a single module.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 3A and 3B are illustrative instruction sets in accordance with exemplary embodiments of the present invention.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be described in further detail below, embodiments of the present invention may provide store or dispense equipment, which include vending machines, appliances, coolers, dispensers, and other like electrical equipment, with configurable energy management capabilities. In accordance with an embodiment of the present invention, some store or dispense equipment may perform both the functions of storing and dispensing, including the vending machines and dispensers described above. The store or dispense equipment may be utilized for heating, cooling, or maintaining an ambient temperature for food, beverage, and/or merchandise. Further, the store or dispense equipment may be used for dispensing beverages, soups, sandwiches, frozen foods including ice cream, snacks, and other food products and merchandise. Other like electrical equipment may include glass door merchandisers, ovens, refrigerators, air conditioning systems, and other heating and cooling equipment known to one of ordinary skill in the art. In accordance with an embodiment of the present invention, such energy management capabilities may be provided by an instruction set, perhaps in the form of an operating template, for the store or dispense equipment. The instruction set may be based upon identified demand models and demand patterns from demand data such as, but not limited to, sales, usage, and occupancy information, patterns, or data for the respective store or dispense equipment. The instruction set may additionally or alternatively be based upon input from at least one of a merchant-owner, a route supervisor, and a bottler associated with the vending machine or other store or dispense equipment. Further aspects of the present invention may also allow for automatic updating or modification of the instruction set according to a learning algorithm. Generally, the learning algorithm may account for changes in the demand data that may change the demand models and demand patterns.

One of ordinary skill will recognize that while embodiments of the present invention will be described with respect to vending machines, those embodiments can equally utilize other store or dispense equipment, including appliances, coolers, dispensers, and other like electrical equipment.

System Overview

Figure 1:
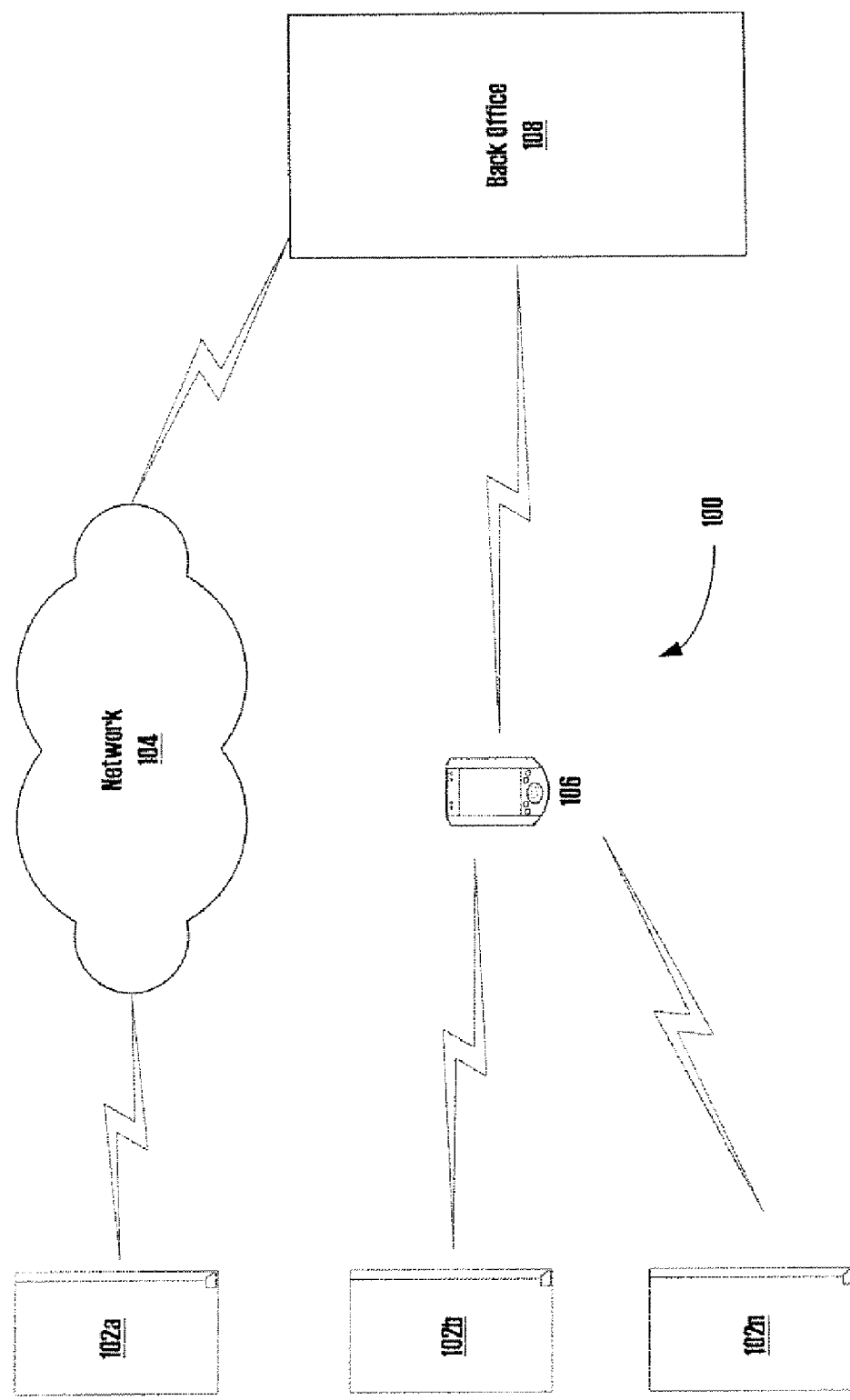
FIG. 1 is an overview of an energy management vending machine system according to an exemplary embodiment of the present invention.

FIG. 1 shows an illustrative energy management system 100 according to an exemplary embodiment of the present invention. The system 100 includes one or more vending machines 102*a-n* and at least one back office processing center 108. The vending machines 102*a-n* can be cold beverage dispensing vending machines, as may be provided by The Coca-Cola Company, Coca-Cola bottlers, and the like. The back office processing center 108 can provide energy management instruction sets for the vending machines 102*a-n* based upon an analysis of the recorded demand (e.g., sales, use, occupancy, etc.) patterns of the vending machines 102*a-n*. In addition or in the alternative, the energy management instruction sets may be based upon input provided by a merchant-owner, a route supervisor, or a bottler associated with of the vending machine. As described in further detail below, these energy management instruction sets may be provided in a variety of formats, depending on whether the target vending machines 102*a-n* include retrofit energy management configurations, integrated energy management configurations, legacy energy management configurations, or variations thereof. Other embodiments of the present invention may include appliances and other electrical equipment in addition to or instead of the vending machines 102*a-n*, including dispensers, glass door merchandiser, ovens, refrigerators and other coolers, and air conditioning systems.

Information can be transmitted or exchanged between the vending machines 102*a-n* and the back office processing center 108 via a variety of communication mechanisms. According to an embodiment of the present invention, this communication mechanism may be a network 104. The network 104 may be one or more wired or wireless networks, either public (e.g., the Internet) or private, and utilizing one of a variety of protocols (e.g., TCP/IP). For example, the network 104 may utilize one or more of WiFi, WiMAX, and commercial carrier networks of any type or speed (e.g., dial-up, DSL, cable modem, fiber optic carrier, etc.).

According to another embodiment of the present invention, the communication mechanism between the vending machines 102*a-n* and the back office processing center 108 can include one or more portable devices 106. These portable devices may be handheld, but they can also be installed in a vehicle (e.g., a van) for wireless drive-by retrievals. The portable device 106 can communicate with one or more of the vending machines 102*a-n* and the back office processing center 108 via wired or wireless mechanisms. For example, the portable device 106 may be operative to retrieve information from and download information to the vending machine 102*a-n* using a wireless network such as SMS (short messaging system), WiFi, Bluetooth, or any other suitable protocol. Alternatively, the portable device 106 may communicate with one or more vending machines 102*a-n* via a wired cable connection, perhaps in conjunction with a communication protocol such as the DEX/UCS (Direct Exchange) protocol. Similarly, the portable device 106 can also retrieve information from and download information to the back office processing center 108 via one of the wireless and wired mechanisms described above. One of ordinary skill in the art will recognize that the wireless and wired mechanisms described above are by way of example only and that other wireless and wired mechanisms can be utilized without departing from embodiments of the present invention.

System Operation

The operation of the vending machine energy management system 100 of FIG. 1 will now be described with respect to the flowchart of FIG. 2. In particular, as shown in block 202 of FIG. 2, information that includes demand data is retrieved from a vending machine 102*a-n*. In particular, the demand data can be retrieved from the vending machine 102*a-n* by the back office processing center 108 via a portable device 106 or a network 104. With the portable device 106 or the network 104, the demand data can be retrieved in a batch, perhaps on a periodic basis. For a network 104 with a real-time connection, such as a DSL connection, the demand data can be retrieved from the vending machine 102*a-n* immediately or shortly after each sales transaction.

Figure 2:
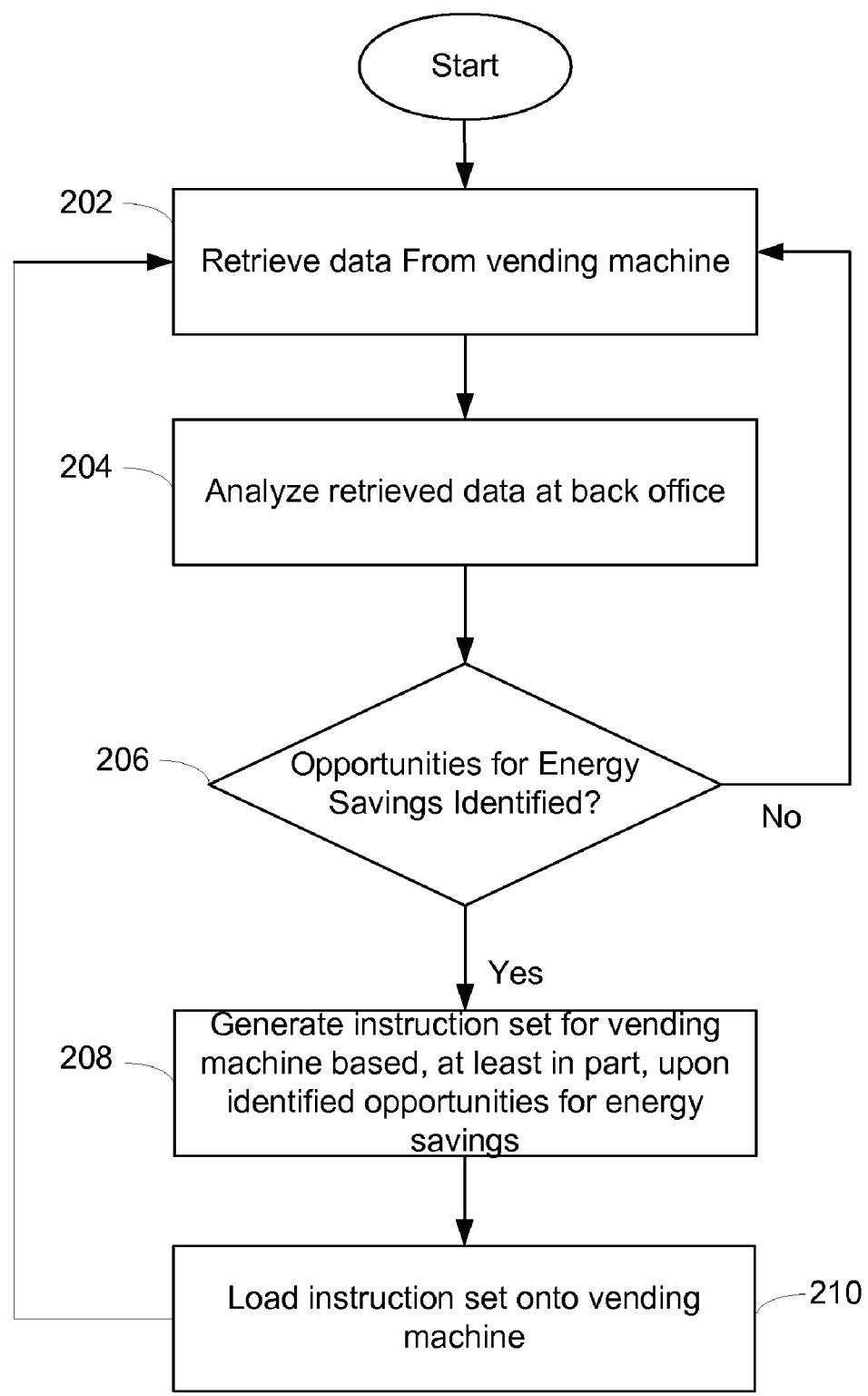
FIG. 2 is a flowchart illustrating a process for energy management of a vending machine according to an exemplary embodiment of the present invention.

With respect to the demand data retrieved in block 202 of FIG. 2, the demand data may include sales, use, and/or occupancy information associated with the vending machine 102*a-n*. The demand data may include one or more of the type of beverage purchased, a time or period of time associated with the beverage purchase, and/or a summary of the number of beverages purchased within one or more time periods. In an embodiment of the present invention, the demand data may indicate the number of beverage sales made by the vending machine 102*a-n* during 1-hour intervals during each day or portions of each day for a two week period. Further, the demand data may also record the payment types utilized for the beverage sales, including non-cash payments and cash payments and currencies. Other embodiments of the vending machine 102*a-n* may record demand data for shorter or longer intervals and/or periods of time without departing from embodiments of the present invention. In addition, as described above, the demand data may be provided or become available instantaneously, i.e., in real-time, for retrieval or transmission in some embodiments of the present invention.

In an embodiment of the present invention, the demand data is retrieved from the vending machine 102*a-n* by a delivery person (e.g., a route driver) via the portable device 106. The portable device 106 may communicate with the vending machine 102*a-n* via a wired connection using the DEX/UCS protocol. With such a wired connection, the vending machine 102*a-n* may first need to be unlocked. Alternatively, the portable device may establish a wireless connection with the vending machine 102*a-n*. However, as described above, in other embodiments of the present invention, the demand data may be retrieved directly by the back office processing center 108 via one or more networks, either private or public, including the Internet. In addition, the demand data can be provided to the back office processing center 108 in real-time, where each sales transaction may be transmitted from the vending machine 102*a-n* to the back office processing center 108 upon completion of the sales or vending transaction.

As illustrated in block 204 of FIG. 2, the demand data retrieved from the vending machine 102*a-n* is provided or transmitted to the back office processing center 108 for analysis, perhaps via the network 104 or the portable device 106 of FIG. 1. As described above, the demand data can include sales information and data. Other demand data can include an indication of the number of prospective customers in the proximity of the vending machine 102*a-n* (e.g., proximity or use data). For example, some embodiments of the present invention may include a motion detector associated with the vending machine 102*a-n* for detecting prospective customers. Similarly, prospective customers may also be detected via the presence of customer mobile payment devices (e.g., PayPass or other types of RFID cards, cell phones, wireless PDAs, other transponders, and the like) for making purchases from the vending machine 102*a-n*. Yet other demand data may include an indication of beverages or other products requested for purchase, but which were not then available.

Having received the demand data, the back office processing center 108 may analyze the demand data (block 204) to determine whether there are opportunities for energy savings or other energy management (e.g., whether a demand pattern can be identified) for the vending machine 102*a-n*, as illustrated in block 206. For example, the back office processing center 108 may determine, from the demand data, that for a particular day of the week, there are significant numbers of beverage sales made by the vending machine 102*a-n* from 2:00 pm to 4:00 pm while only a small number of beverage sales are made from 4:00 pm to 6:00 pm. Accordingly, the back office processing center 108 identifies that there may be an opportunity for energy conservation during at least a portion of 4:00 pm to 6:00 pm.

In block 206, if the back office processing center 108 has identified opportunities for energy savings (e.g., a demand pattern), then the back office processing center 108 generates an instruction set, perhaps in the form of an operating template, for the vending machine 102*a-n* that incorporates at least a portion of the identified opportunities for energy savings, as illustrated in block 208. In accordance with an embodiment of the present invention, there are several methods by which a back office processing center 108 may identify whether there are opportunities for energy savings. Indeed, the back office processing center 108 may have several criteria for evaluating the demand data retrieved from the vending machine 102*a-n*. The criteria may include whether the amount of beverages or other products sold during a particular interval exceeds a predetermined amount. For example, if the amount of beverages sold during a particular 1-hour interval does not exceed a predetermined number, then there may be opportunities for energy savings in the lighting system and/or refrigeration system components for that particular 1-hour interval. The criteria may also include operational limitations provided by a merchant-owner, a bottler, and/or a route supervisor. For example, the merchant-owner, bottler, and/or route supervisor may specify that the lighting equipment or particular refrigeration system components should be in operation during particular intervals irrespective of the demand data. In addition, the criteria could also be determined by a best-fit operating template from a plurality of operating templates for the demand data. For example, the demand data may be transformed into a histogram pattern, and an operating template that closely matches the histogram pattern may be selected. Other statistical calculations can be used to analyze the demand data to identify opportunities for energy savings. Still further, the criteria for evaluating the demand data may include an evaluation of historical weather patterns (e.g., ambient temperature).

As described above, if the back office processing center 108 has identified opportunities for energy savings (block 206), then the back office processing center 108 generates an instruction set for the vending machine 102*a-n* that incorporates at least a portion of the identified opportunities for energy savings, as illustrated in block 208. The instruction set may specify one or more modes of operation or configurations for the vending machine 102*a-n*, or components thereof. For example, the instruction set may specify whether one or more components of the vending machine 102*a-n* are operating in normal, standby, or storage mode according to an exemplary embodiment of the present invention. In addition or in the alternative, the instruction set can also specify operating temperatures for one or more components of the vending machine 102a-n. For the example described above, the instruction set may specify that the refrigeration system components of the vending machine 102a-n maintain a lower temperature (e.g., 32° F.) from at least a portion of the time from 2:00 pm to 4:00 pm when there are likely to be significant numbers of beverage sales and a higher temperature (e.g., 45° F.) From at least a portion of the time from 4:00 pm to 6:00 pm when there are likely to be fewer numbers of beverage sales. Similarly, the instruction set may also specify that that the lighting system operates from around 2:00 pm to 4:00 pm and shuts down or dims, in whole or in part, from around 4:00 pm to 6:00 pm.

In accordance with an embodiment of the present invention, the instruction set may also be modified or varied based upon input from a merchant-owner, bottler, or route supervisor associated with the vending machine 102a-n. For example, a merchant-owner (or a bottler, route supervisor, etc.) may override a proposed instruction set that turns off or dims the lighting system during certain business hours. Other variations may be made to the instruction set to accommodate the merchant-owner's business needs in accordance with other embodiments of the present invention.

Still referring to FIG. 2, the instruction set from the back office processing center 108 is then loaded onto the vending machine 102a-n, as illustrated in block 210. In particular, according to an embodiment of the present invention, the instruction set may be directly provided to the vending machine 102a-n via the network 104, which may be private or public, including the Internet. In another embodiment of the present invention, the instruction set may be loaded from the back office processing center 108 to the portable device 106 and subsequently downloaded from the portable device 106 to the vending machine 102a-n. The vending machine 102a-n then operates its refrigeration system components, vending machine controller, and/or lighting equipment in accordance with the operating specifications in the instruction set. Of course the instruction set may be updated by performing the steps recited in blocks 202 210 described above. In other embodiments of the present invention, the vending machine 102a-n may automatically modify the instruction set based, at least in part, on its recorded demand data, perhaps in accordance with one of the learning algorithms described in U.S. Pat. No. 6,745,581. For example, the instruction set may be altered if the demand data changes above a threshold or if the demand pattern changes over a period of time. Many other variations will be readily recognized by one of ordinary skill in the art.

Turning now to the instruction sets described above, FIG. 3A provides an illustrative instruction set (e.g., an operating template) provided by a back office processing center 108 in accordance with an embodiment of the present invention. In particular, as shown in FIG. 3A, the instruction set provides a matrix of operating specifications for electrical components (e.g., refrigeration system components, vending machine controller, lighting equipment, etc.) of the vending machine 102a-n according to periodic increments of time. In an exemplary embodiment of the present invention, these periodic increments may include one-hour increments for each day of the week, although other time increments could be utilized. These operating specifications may also include specifying when certain electrical components of the vending machine 102a-n operate in a normal mode, a standby mode, and a storage mode. According to an exemplary embodiment of the present invention, the normal mode for the refrigeration system of a vending machine 102a-n may involve maintaining an internal temperature of about 32° F. The internal temperature of about 32° F. may allow the beverage or other product to be maintained at the cold end of the consumer preferred consumption temperature range. On the other hand, the standby mode may involve maintaining an internal temperature of about 45° F. The internal temperature of about 45° F., which is at the warmer end of the consumer preferred consumption temperature range, allows the internal temperature to be quickly pulled back down to about 32° F. when desired. The storage mode may involve maintaining a higher internal temperature of about 60° F., which is outside of the consumer preferred consumption temperature range, but is sufficient to maintain beverage or product quality. Of course, fewer or additional modes and other temperatures may be utilized without departing from embodiments of the present invention. For example, according to another embodiment of the present invention, there may only be a normal mode and an energy savings mode.

FIG. 3B provides another illustrative instruction set provided by a back office processing center 108 in accordance with an embodiment of the present invention. As shown in FIG. 3B, the approximate temperature to be maintained by the refrigeration system is explicitly specified. This can allow the temperature of the vending machine 102a-n to be controlled on a more customized basis. For example, as shown for Thursday in FIG. 3B, the temperature can be set to around 32° F. (i.e., 0° C.) from 11:00 am to 2:59 pm, 36° F. from 3:00 pm to 5:59 pm, and back to 32° F. from 6:00 pm to 7:59 pm. While FIG. 3B illustrates an instruction set that explicitly specifies temperatures, one of ordinary skill in the art will recognize that temperatures can be implicitly specified through the use of offsets. In particular, the temperature offset from a predetermined operating temperature may be specified (e.g., +/−a certain number of degrees from a predetermined temperature (e.g., 32° F.)). For example, 36° F. can be represented by an offset of +4.

In addition, as shown in FIGS. 3A and 3B, the instruction sets can also include specifying whether a fan such as a condenser fan runs in reverse and whether the lights are turned on or off. While not illustrated in FIGS. 3A and 3B, the instruction sets can also specify one or more operational speeds for the fans, including the condenser fan and evaporator fan. Likewise, other variations of the illustrative instruction sets in FIGS. 3A and 3B are possible. For example, the instruction set may include a matrix of operating specifications with periods other than one-hour increments, for example, ½ hour increments, 2-hour increments, 4-hour increments, etc.

As introduced above with respect to FIGS. 3A and 3B, the back office processing center 108 may provide an instruction set that runs the condenser fan in reverse during certain periods of time in order to improve the refrigerant conversion efficiency. In particular, typical refrigeration condensers in the vending machines 102a-n may be made of metal tubing with condenser fins that increase the surface area for air to contact in order to improve the refrigerant efficiency of the condenser. These vending machines 102a-n may use condenser fans to force air across these condenser fins. Because the refrigeration systems in the vending machines 102a-n are often mounted near the floor, the air being forced across the condenser fins contains lint and dirt. Over time, lint and dirt builds up on the condenser fins, especially in condensers with tight fins arrangements, thereby resulting in poor airflow across the condenser. Poor airflow across the condenser reduces the energy efficiency and performance of the entire refrigeration system, and may cause premature failures in refrigeration system components, including the compressor.

Thus, in accordance with an aspect of the present invention, the use of an instruction set that specifies reversals of the condenser fan occasionally can dislodge lint and dirt that may be trapped in the condenser fins. Accordingly, occasionally reversing the normal operation of the condenser fan, as specified by the operating specifications of the instruction set, can help prevent the build-up of those substances over time and improve the refrigerant conversion efficiency of the vending machine 102a-n. In accordance with an exemplary embodiment of the present invention, the instruction set may specify reversal of the condenser fan during times in which customers would be very unlikely to be utilizing the vending machine 102a-n. For example, the reversal of the condenser fan may be specified during known non-business hours of the outlet. In accordance with another embodiment of the present invention, the instruction set may conditionally enable the condenser fan, but the condenser fan may only run in reverse if the vending machine 102a-n does not detect the presence of any potential customers, perhaps via the use of one or more motion detectors. This may minimize the risk that hot air, dirt, and lint from being blown by the vending machine 102a-n onto unsuspecting customers.

Furthermore, the reversal of the condenser fan can be controlled independently of the compressor—that is, the condenser fan does not necessarily run in reverse when the compressor is running. For example, the instruction set can control how long, how often or how many cycles the condenser fan would run in reverse during standby of the vending machine 102a-n, before or after every compressor cycle, before or after every other compressor cycle, and the like. Many other variations of the reverse mode of operation are available.

In addition to the operating specifications described with respect to the instruction sets, other information may be loaded onto the vending machine 102a-n as part of or in addition to the instruction set. For example, the instruction set may specify any of the user-settable options within the vending machine 102a-n. These user-settable options may include adjustable parameters of the vending machine 102a-n such as parameters associated with currency options for payments. Further, custom advertisements can be specified for a display of the vending machine 102a-n. Similarly, other media presentation, either audio or visual, may be provided for the vending machine 102a-n. The media presentation may also be interactive in order to provide for interactive vending. For example, the media presentation may prompt the user to "Vote for your favorite racecar driver."

Further, in accordance or in conjunction with the instruction set, these advertisements or other media may not be displayed or presented when customers are not in the vicinity of the vending machine 102a-n in order to maximize energy conservation and enhance the life of the display. For example, the presentation of advertisements or other media may be based upon the use, door opening, motion detector, etc. associated with the vending machine 102a-n. According to another aspect of the invention, pricing information can be provided for one or more of the beverages. For example, this pricing information may be static during all time intervals. However, in accordance with an embodiment of the present invention, this pricing information may vary depending on the time of day and day of week. For example, the pricing information may be higher when the components of the vending machine 102a-n are operating in normal mode and lower when one or more components of the vending machine 102a-n are operating in an energy savings mode. According to another aspect of the invention, the types of beverages may be specified for each of the dispensing units or columns of the vending machine 102a-n. Likewise, button mapping programming may be provided to correspond to the type of beverage in the respective dispensing unit or column. According to still another aspect of the invention, vending machine 102a-n user settable options may be provided for, including display options and currency options like bill escrow.

Energy Management Configurations

Figure 4:
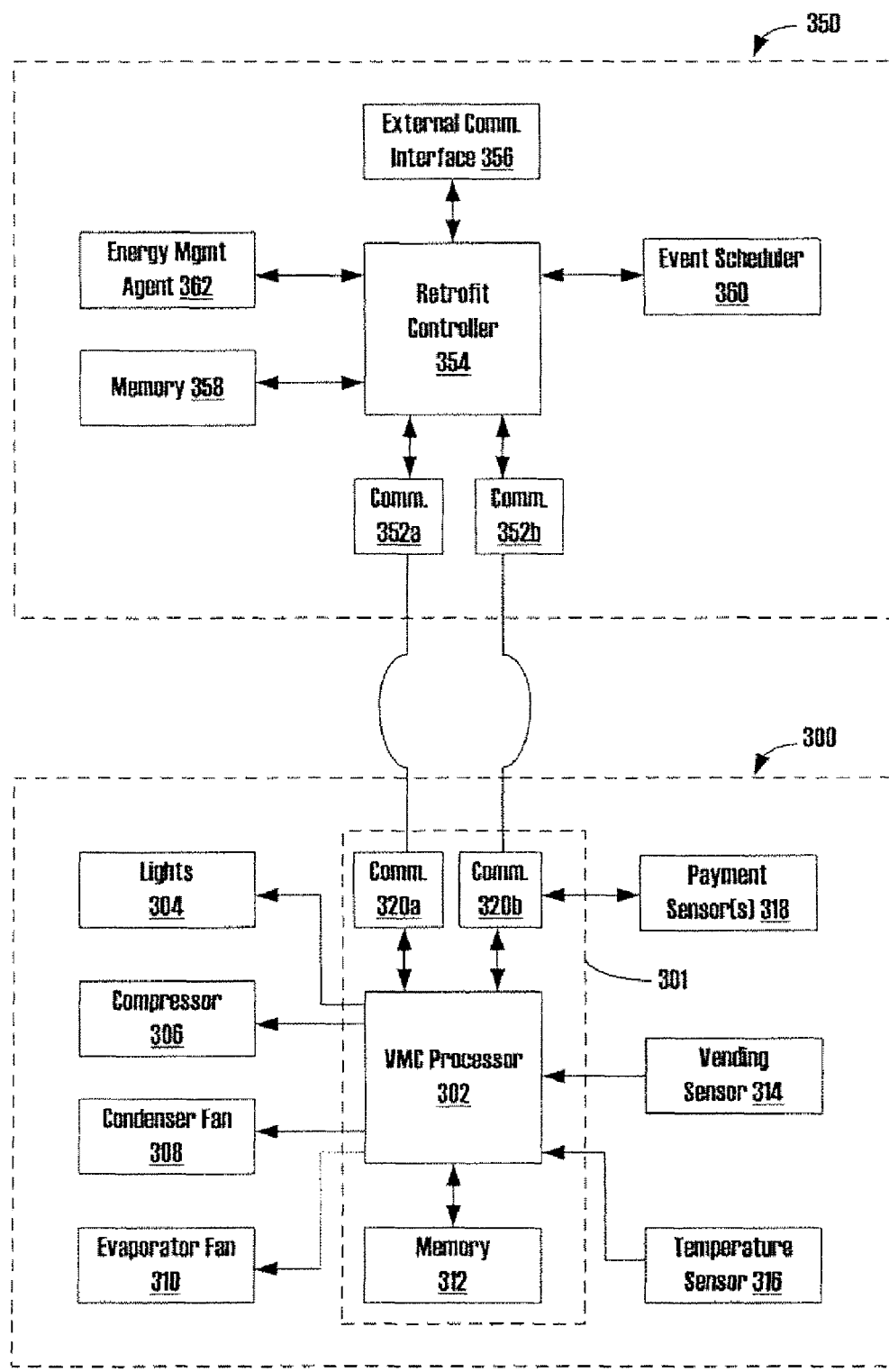
FIG. 4 is a block diagram illustrating a retrofit audit device for implementing energy management with existing vending machine configurations according to an exemplary embodiment of the present invention.
Figure 5:
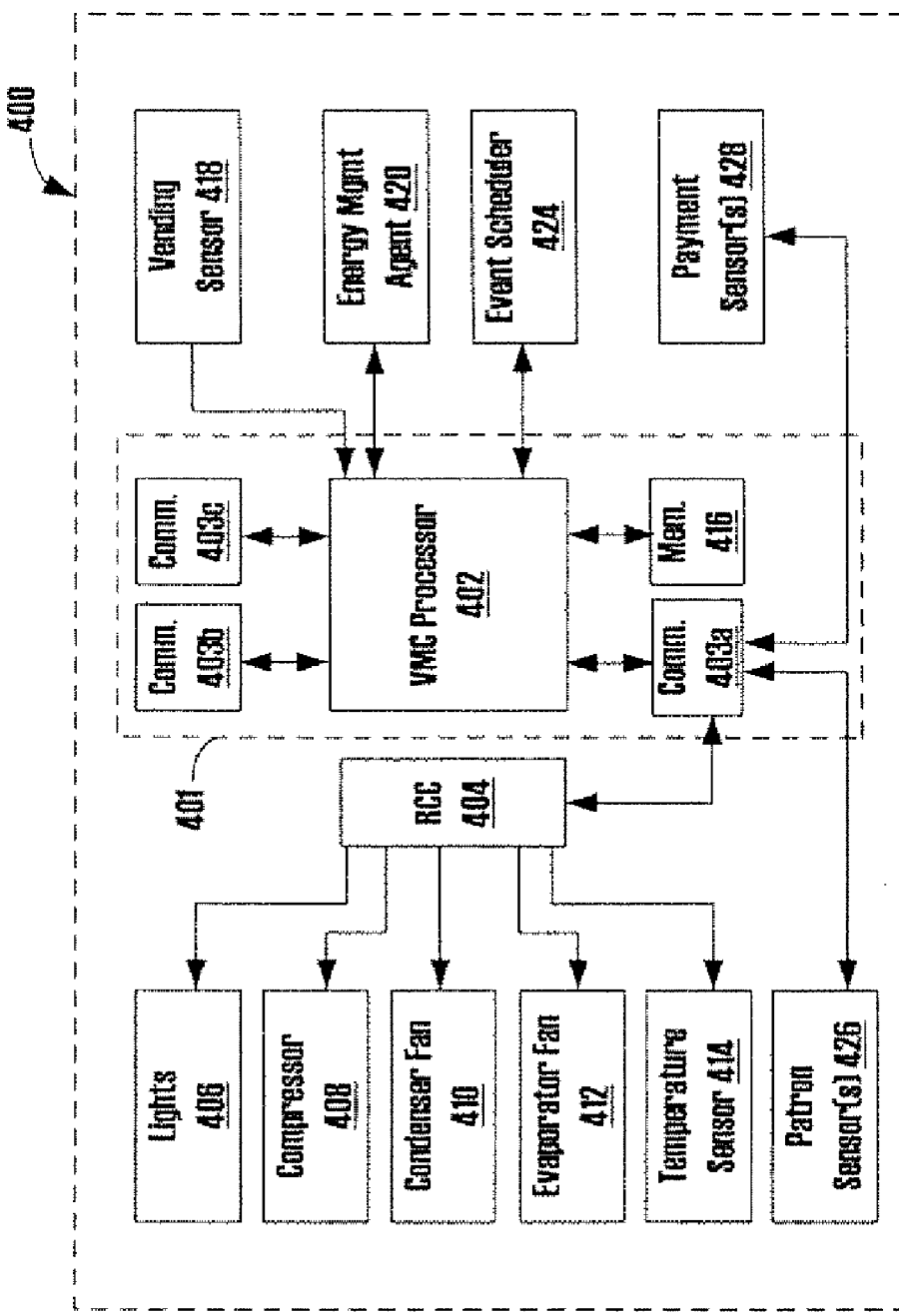
FIG. 5 is a block diagram for an integrated energy management configuration for a vending machine according to an exemplary embodiment of the present invention.

A variety of vending machine 102a-n configurations are available to implement the energy management features described above. In particular, FIG. 4 illustrates an exemplary configuration for a vending machine 102a-n that utilizes a retrofit audit device according to an embodiment of the present invention. FIG. 5 illustrates an energy management configuration for a vending machine 102a-n that does not utilize a retrofit audit device, according to an exemplary embodiment of the present invention. Each of these configurations will now be discussed in further detail with respect to the exemplary figures. One of ordinary skill in the art will recognize that these figures are only exemplary in nature and that many variations are possible.

A. Retrofit Audit Device Configuration

With reference to FIG. 4, there is a vending machine 300 in communication with a retrofit audit device 350. The vending machine 300 includes a vending machine controller (VMC) 301 and a plurality of components in communication with the vending machine controller 301. According to an embodiment of the present invention, the retrofit audit device 350 may be coupled to the vending machine controller 301 and may provide energy management capabilities to the vending machine 300. Furthermore, the retrofit audit device 350 may be physically located within the enclosure of the vending machine 300. However, in other embodiments of the present invention, the retrofit audit device may be located outside of the vending machine 300, perhaps as a stand-alone device or as a network device. The network device can be located locally at an outlet or remotely at the back office processing center 108.

Still referring to FIG. 4, the vending machine controller 301 may be in communication with a variety of components. In particular, the vending machine controller 301 can control or otherwise direct the operation of the lighting equipment 304 and the refrigeration system components, which may include the compressor 306, at least one condenser fan 308, and at least one evaporator fan 310. Further, the vending machine controller 301 may receive at least one operating temperature from one or more temperature sensors 316 as well as purchase information from one or more vending sensors 314. The vending sensors 314 may include a door sensor, a selection button, and/or a motion detector. The purchase information, which may specify information regarding beverage purchases, can form a portion of the demand data that may be stored in the memory 312. This portion of the demand data may be stored in memory 312 with an associated date, day, and/or time stamp. Alternatively, the portion of the demand data stored in memory 312 can be periodically retrieved or retrieved real-time (e.g., after each sales transaction) by the retrofit audit device 350 and stored in memory 358 with a date, day, and/or time stamp.

In addition, the vending machine controller 301 may control and receive input from one or more payment sensors 318. These payment sensors 318 may include one or more of a coin mechanism, a bill validator, and a card reader. For example, the vending machine controller 301 may periodically poll the coin mechanism, bill validator, and card reader for the presence or insertion of coins, dollar bills, and magnetic stripe cards, respectively. In other embodiments the present invention, the payment sensors 318 may include a module for receiving and responding to a payment request from a customer's mobile payment device. Other embodiments of the present invention may also include a motion detector, perhaps as part of the one or more vending sensors 314 described above, in communication with the vending machine controller 301 for detecting the presence of prospective customers. Many other variations will be well-known to one of ordinary skill in the art.

Still referring to FIG. 4, the vending machine controller 301 includes a VMC processor 302, a memory 312, and communications modules 320*a*, 320*b*. In some embodiments of the present invention, the memory 312 may be incorporated with the VMC processor 302 while in other embodiments, the memory 312 may be a stand-alone memory module. The memory 312 may store instructions, perhaps instructions associated with the instruction set described above, for execution by the VMC processor 302. These instructions may control the operation of one or more of the lighting equipment 304, the compressor 306, the condenser fan 308, and the evaporator fan 310 according to an exemplary embodiment of the present invention. As described above, the memory 312 may also store at least a portion of the demand data for the vending machine 300. For example, the demand data may include beverage purchase information associated with input received by the vending machine controller 301 from the vending sensor 314 and/or payment sensor(s) 318. In other embodiments of the present invention, the demand data may be associated with input received from a emotion detector for determining the presence of prospective customers. As described above, the demand data in memory 312 may also include an associated date, day, and/or time stamp. As also described above, the demand data in memory 312 may be periodically retrieved or retrieved in real-time by the retrofit audit device 350 and stored in memory 358 with a date and/or time stamp.

The VMC processor 302 may also be operative with two communications modules—that is, communications modules 320*a* and 320*b*. First, communications module 320*a* may be coupled to communications module 352*a* of the retrofit audit device 350. According to a preferred embodiment of the present invention, the link between communications modules 352*a* and 320*a* may be via a wired DEX/UCS link. Such a DEX/UCS link may allow the retrofit audit device 350 to retrieve or receive demand data stored in the memory 312. Further, the DEX/UCS link may also allow the retrofit audit device 350 to instruct the vending machine controller 301 to implement particular energy management functionality for particular components of the vending machine 300, including controlling the lighting equipment 304 and the components of the refrigeration system such as the condenser fan 308 and the evaporator fan 310.

Second, communications module 320*b* may be coupled to communications module 352*b* of the retrofit audit device 350 in order to provide a bus link (e.g., a multi-drop bus (MDB) link, universal serial bus (USB) link, etc.). The bus link allows additional devices, including the payment sensor(s) 318 in the vending machine 300 to communicate with the vending machine controller 301. Further, information associated with these additional devices, including information from the payment sensor(s) 318, can be provided to the retrofit audit device 350 via the bus link. Moreover, the bus link can also facilitate the real-time retrieval of demand data by the retrofit audit device 350 and/or back office processing center 108.

In other embodiments of the present invention, one or more of the lighting equipment 304, compressor 306, condenser fan 308, and evaporator fan 310 may be coupled to the VMC processor 302 via the bus link described above. In addition, while communications modules 320*a*, 320*b* have been illustrated as distinct modules, they may also be implemented as a single module without departing from embodiments of the present invention.

Turning now to the retrofit audit device 350 itself, a retrofit controller 354 is in communication with the communications modules 352*a* and 352*b* described above. The retrofit audit device 350 further includes an external communication interface module 356, a memory 358, an event scheduler module 360, and an energy management module 362. The external communication interface module 356 allows demand data to be retrieved by the back office processing center 108 via the network 104 or the portable device 106, as previously described with respect to FIG. 1. Likewise, the instruction set from the back office processing center 108 can be received via the external communication interface module 356 and stored in the memory 358. Based upon the received instruction set, the energy management agent module 362 may register certain events (e.g., action and periodic date/time) with the event scheduler module 360. According to an exemplary embodiment of the present invention, the event scheduler module 360 may include or otherwise be in communication with a real-time clock and/or calendar and thus be capable of informing the energy management agent module 362 when a registered event should take place (e.g., a day, time, etc.). For example, based upon the received instruction set, the energy management agent module 362 may register an event with the event scheduler module 360 that specifies particular times to turn off and on (or dim) all or some of the lighting equipment 304. Other registered events may specify particular times to run and stop the condenser fan 308, and perhaps also specify a particular speed for the condenser fan 308. One of ordinary skill in the art will recognize that the energy management agent module 362 can also register an event associated with turning off or on the entire vending machine 300. Many other variations of events will be well known to those of ordinary skill in the art. For example, the registered events could additionally specify a day of the week in addition to the particular times.

When the event scheduler module 360 informs the energy management agent module 362 that a registered event should now be performed, the energy management agent module 362 communicates corresponding instructions to the retrofit controller 354 to execute the particular event. The retrofit controller 354 completes the instructions by transmitting corresponding instructions to the VMC processor 302 for execution. In executing the instructions, the VMC processor 302 may turn the lighting equipment 304 on or off, or the condenser fan 308/evaporator fan 310 on or off, in accordance with an embodiment of the present invention. One of ordinary skill in the art will recognize that while the event scheduler module 360 and energy management agent module 362 have been illustrated in FIG. 4 as distinct modules, both modules could be implemented as a single module, including a single body of code. In addition, either or both of the event scheduler module 360 and energy management agent module 362 may be implemented as software modules or instructions of the memory 358. Further, in other embodiments of the present invention, the memory 358 may be implemented as part of the retrofit controller 354. Likewise, one of ordinary skill in the art will recognize that while communications modules 352*a*, 352*b* have been illustrated as distinct modules, they may also be implemented as a single module without departing from embodiments of the present invention.

B. Integrated Energy Management Configuration

FIG. 5 illustrates an energy management configuration for a vending machine 400 with an integrated retrofit audit device capability according to an exemplary embodiment of the present invention. The vending machine 400 includes a vending machine controller 401, which includes a VMC processor 402, in communication with several components. In particular, the vending machine controller 401, and thus, the VMC processor 402, communicates with a cassette controller 404 (e.g., a refrigeration cassette controller (RCC)), a patron sensor 426, and a payment sensor 428 via communications module 403a, which provides a bus link (e.g., multi-drop bus (MDB) link, universal serial bus (USB) link, etc.). The cassette controller 404 provides a physical connection through which the VMC processor 402 can provide control instructions to one or more of the lighting equipment 406 and the refrigeration system components, which may include a compressor 408, a condenser fan 410, an evaporator fan 412, and a temperature sensor 414.

The patron sensor 426 described above may include a door sensor motion detector, etc. for determining the presence of one or more patrons or customers. The payment sensor 428 may include one or more of a coin mechanism, a bill validator, and a card reader that is periodically polled by the VMC processor 402 for the presence or insertion of coins, dollar bills, magnetic stripe cards, or RFID cards respectively. The payment sensor 428 may also include a module for receiving and responding to a payment request from a customer's mobile payment device.

In addition, the VMC processor 402 may be in communication with one or more vending sensors 418, an energy management agent module 420, and an event scheduler module 424. In addition or in the alternative to the patron sensor 426 described above, the vending sensors 418 may provide the VMC processor 402 with information associated with purchases and/or prospective purchases. According to an exemplary embodiment of the present invention, the vending sensors 418 may include a door sensor, a selection button, and/or a motion detector. The energy management agent module 420 may register events with the event scheduler module 424, which may include or be in communication with a real-time clock and/or calendar, in particular, the event registered with the event scheduler module 424 may include a particular time for turning off and on one or more of the of the lighting equipment 406 and refrigeration system components, including the compressor 408, the condenser fan 410, and the evaporator fan 412. One of ordinary skill in the art will recognize that the energy management agent module 420 can also register an event associated with turning off or on the entire vending machine 400. Once the events have been registered with the event scheduler module 424, the event scheduler module 424 may notify the energy management agent module 420 when a particular event should occur. Once the energy management agent module 420 receives the notification, the energy management agent module 420 provides instructions to the VMC processor 402 to carry out the particular instructions. In response to the instructions, the VMC processor 402 may turn on or off one or more of the lights 406 and refrigeration system components, including the compressor 408, the condenser fan 410, and the evaporator fan 412. The VMC processor 402 may direct the condenser fan 410 to run in reverse according to an exemplary embodiment of the present invention.

While the energy management agent module 420 and event scheduler module 424 have been depicted in FIG. 5 as distinct modules for illustrative purposes, they could be combined into a single module, including a single body of code, without departing from embodiments of the present invention. Further, the energy management agent module 420 and the event scheduler module 424 can also reside as software modules or instructions in the memory 416. While memory 416 is illustrated as being distinct from the VMC processor 402, one of ordinary skill in the art will recognize that the memory 416 can be implemented as a part of the VMC processor 402. Many other variations will be readily apparent to one of ordinary skill in the art.

Turning now more particularly to the vending machine controller 401, the VMC processor 402 is in communication with the communications modules 403a, 403b, and 403c. As described above, the communications module 403a may be provided as a bus link (e.g., multi-drop bus (MDB) link, universal serial bus (USB) link, etc.). The communications module 403b may allow for communications with the vending machine controller 401 over a wired connection, perhaps using a DEX/UCS protocol according to an exemplary embodiment of the present invention. Likewise, the communications module 403c may be provided for external communications, perhaps via the network 104 or the portable device 106 illustrated in FIG. 1. One of ordinary skill in the art will recognize that one or more of the communications modules 403a, 403b, and 403c could be combined into a single communications module. Further, alternative embodiments of the present invention may only include one or more of the communications modules 403a, 403b, and 403c.

Still referring to FIG. 5, as discussed above, the vending machine controller 401 includes a memory 416. The memory 416 allows the vending machine 400 to record demand data. For example, sales information provided by the vending sensor 418 regarding purchased beverages may be stored as demand data in the memory 416. In addition, information provided by the vending sensor 418, which may be a motion detector as described previously, may also be stored as demand data in the memory 416. This demand data may also be stored with an associated date, day, and/or time stamp. The demand data can then be retrieved from the vending machine 400 via the external communications module 403c. For example, the demand data can be transmitted to the back office processing center 108 via the network 104 or the portable device 106, as described with reference to FIG. 1. If the back office processing center 108 can identify a demand pattern that presents an opportunity for energy savings, the back office processing center 108 can generate an instruction set, perhaps in the form of an operating template, for the vending machine 400, as described above. The instruction set can be loaded onto the vending machine 400 via the external communications module 403c. The instruction set may be stored in the memory 416 or another memory location by the energy management agent module 420. The energy management agent module 420 then registers events in accordance with the instruction set with the event scheduler module 424, as discussed above. The event scheduler module 424 may notify the energy management agent module 420 when a particular event should occur. Once the energy management agent module 420 receives the notification, the energy management agent module 420 provides corresponding instructions to the VMC controller 402 to carry out the particular instructions.

C. Legacy Energy Management Configuration

Figure 6:
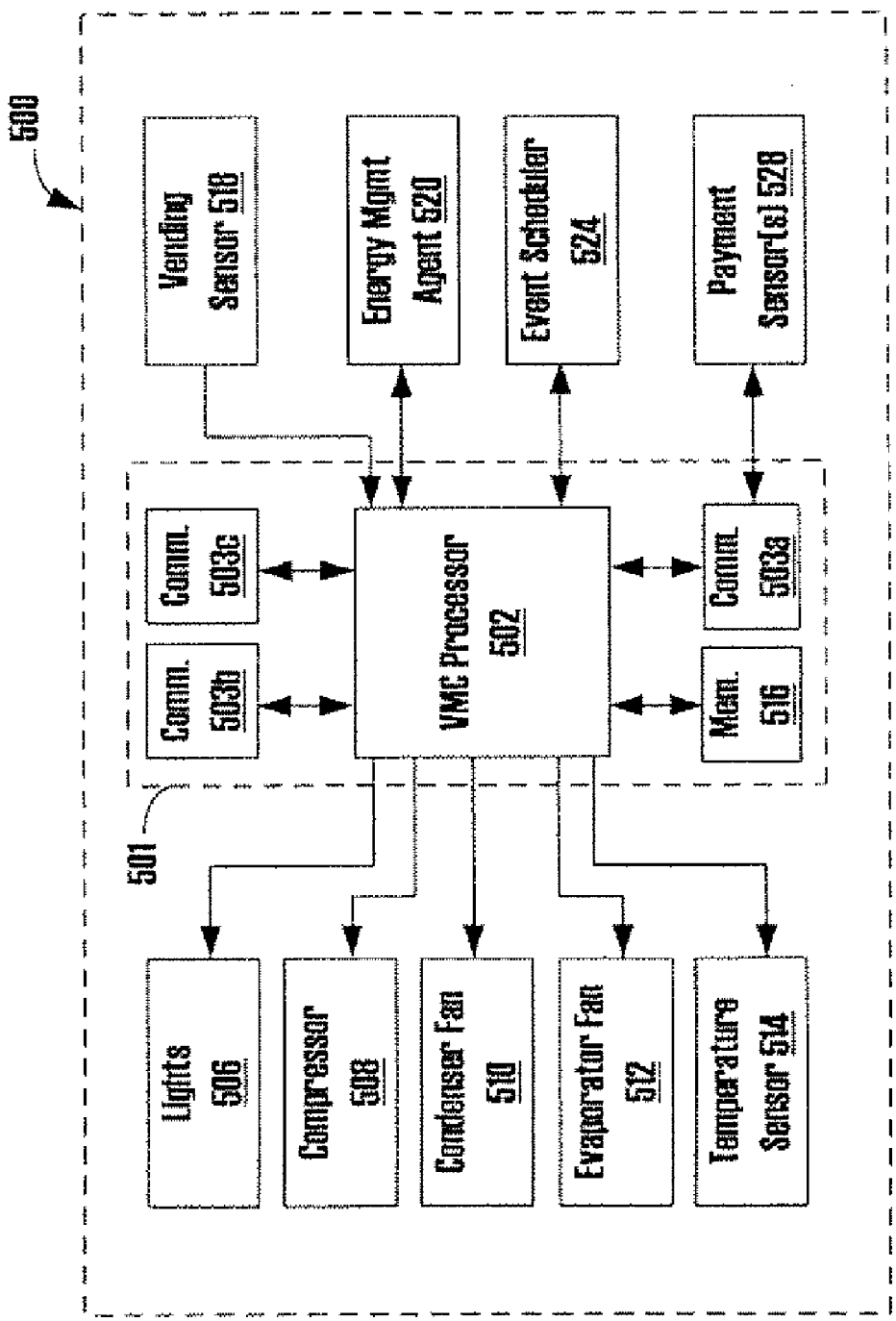
FIG. 6 is a block diagram for a legacy energy management configuration for a vending machine according to an exemplary embodiment of the present invention.

FIG. 6 illustrates a legacy energy management configuration for a vending machine 500 according to an exemplary embodiment of the present invention. Generally, the legacy energy management configuration may allow for certain vending machine 500 settings to be specified by the back office 108 for the vending machine 500. As will be described below, a portable device 106 may be utilized to download these vending machine 500 settings, which may be specified in an instruction set, to the vending machine controller 501.

The vending machine controller 501 described above includes a V C processor 502 that is in communication with several components. In particular, the vending machine controller 501, and thus, the VMC processor 502, may communicate with communications modules 503a, 503b, and 503c. Communications module 503a may be provided as a bus link (e.g., multi-drop bus (MDB) link, universal serial bus (USB) link, etc.). The communications module 503b may allow for communications with the vending machine controller 501 over a wired connection, perhaps using a DEX/UCS protocol according to an exemplary embodiment of the present invention. The portable device 106 may download the temperature and time settings to the vending machine controller 501 via the DEX/UCS connection provided by communications module 503b. The communications module 503c may be provided for external communications, perhaps via the network 104 or the portable device 106 illustrated in FIG. 1. One of ordinary skill in the art will recognize that one or more of the communications modules 503a, 503b, and 503c could be combined into a single communications module. Further, alternative embodiments of the present invention may only include one or more of the communications modules 503a, 503b, and 503c.

The VMC processor 502 may communicate with the vending sensor 528 via the bus link provided by communications module 503a. In addition, the VMC processor 502 may also communicate with the lighting equipment 506 and the refrigeration system components, which may include a compressor 508, a condenser fan 510, an evaporator fan 512, and a temperature sensor 514. Likewise, the VMC processor 502 may communicate with a vending sensor 518, an energy management agent module 520, and an event scheduler 524. The energy management module 520 and event scheduler 524 may be implemented as an interlaced body of computer instructions (e.g., a single body of code) without departing from embodiments of the present invention.

According to an exemplary embodiment of the present invention, the energy management agent module 520 may register events with the event scheduler module 524, which may include or be in communication with a real-time clock and/or calendar. In particular, the event registered with the event scheduler module 524 may include a particular time for turning off and on one or more the of the lighting equipment 506 and refrigeration system components, including the compressor 508, the condenser fan 510, and the evaporator fan 512. The energy management agent module 520 can also register an event associated with turning off or on the entire vending machine 500. Once the events have been registered with the event scheduler module 524, the event scheduler module 524 may notify the energy management agent module 520 when a particular event should occur. Once the energy management agent module 520 receives the notification, the energy management agent module 520 provides instructions to the VMC processor 502 to carry out the particular instructions. In response to the instructions, the VMC processor 502 may turn on or off one or more of the lights 506 and refrigeration system components, including, the compressor 508, the condenser fan 510, and the evaporator fan 512.

As introduced above, the portable device 106 may be utilized to download vending machine 500 settings to the vending machine controller 501. These vending machine 500 settings may specify whether the vending machine 500 or components thereof are to be on or off during particular times. Alternatively, the vending machine 500 settings may include temperature and time settings for the vending machine 500. The back office 108 may determine the vending machine 500 settings based upon input from at least one of a merchant-owner, a route supervisor, and a bottler associated with of the vending machine. For example, the merchant-owner may be aware of a store's busy/not busy hours and in an exemplary embodiment, the vending machine 500 settings may specify that components of the vending machine 500 be switched on or off according to the store's busy or not busy hours. Alternatively, the vending machine 500 settings may provide for a lower temperature during the store's busy hours compared to the store's not busy hours.

These vending machine 500 settings described above can be stored in the memory 516 or another memory location in accordance with the requirements of the energy management agent module 520. The energy management agent module 520 then registers events according to the vending machine 500 settings with the event scheduler module 524 discussed above. The event scheduler module 524 may notify the energy management agent module 520 when a particular event should occur. Once the energy management agent module 520 receives the notification, the energy management agent module 520 provides corresponding instructions to the VMC controller 502 to carry out the particular instructions.

In addition to the energy management features described above with respect to the retrofit audit device configuration, the integrated energy management configuration, and the legacy energy management configurations other embodiments of the present invention may include manual modes and toggle switches. For example, manual on/off override switches or the like may be provided for the vending machine 102a-n in order to force the vending machine 102a-n to a desired state. Further, other embodiments of the present invention may include a manual mode toggle. Accordingly, such a manual mode toggle may be implemented as a push button or switch that allows the vending machine 102a-n to be operated in a manual mode instead of automatically via the energy management configuration described previously.

While the above embodiments of the present invention have been directed towards refrigerated vending machines 102a-n, one of ordinary skill in the art will recognize that the energy management of heating components/systems can also be specified in addition or in the alternative to the refrigeration components/system. In particular, the instruction sets can specify operating specifications for these heating components/systems. In addition, other appliances and electrical equipment can be utilized for energy management instead of or in addition to the vending machines 102a-n, As described above, these appliances and other electrical equipment may include dispensers, glass door merchandiser, ovens, refrigerators and other coolers, and air conditioning systems. Thus, in accordance with an embodiment of the present invention, demand data may be retrieved from these appliances and other equipment and analyzed at a back office. If there are opportunities for energy management, then the back office can create an instruction set for these appliances and other electrical equipment. The instruction sets can then be loaded on the appliances and other electrical equipment.

Other embodiments of the present invention may also include stand-alone energy management devices that control the power source for the dispensers, vending machines, glass door merchandisers, ovens, refrigerators or other coolers, air conditioning systems, and other appliances and electrical equipment. In accordance with such an embodiment of the present invention, the appliances and electrical equipment may plug into the stand-alone energy management device, which is itself ultimately connected to a power source.

Demand data may be retrieved from these appliances and electrical equipment and analyzed at a back office. Alternatively, demand data may be retrieved from the stand-alone energy management device itself, perhaps in the form of information provided by one or more motion detectors. If there are opportunities for energy management, then the back office can create an instruction set for the stand-alone energy management device. The instruction set is then loaded onto the stand-alone energy management device. In accordance with the instruction set, the stand-alone energy management device provides the attached appliance and/or electrical equipment with power on the days and/or times indicated in the instruction set. In accordance with an embodiment of the present invention, the stand-alone energy management device, in accordance with the instruction set, can also control the quantity of power supplied to the attached appliance and/or electrical equipment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing energy management functionality for store or dispense equipment, comprising:
    retrieving, via at least one portable device or wireless network, demand data from the store or dispense equipment, wherein the demand data includes usage information associated with the store or dispense equipment;
    providing the demand data from the at least one portable device or wireless network to a processing center remote from the store or dispense equipment, the processing center comprising one or more computers, wherein the processing center is operative to:
        analyze the demand data to determine a demand pattern;
        prepare an instruction set for the store or dispense equipment by at least:
            identifying an operating template from a plurality of operating templates, wherein the operating template is identified from the plurality of operating templates based upon the identified operating template being a closest match for the determined demand pattern, the identified operating template specifying predetermined time periods and corresponding predetermined modes of operation for at least one component of the store or dispense equipment during the predetermined time periods; and
    loading, via the at least one portable device or wireless network, the instruction set onto the store or dispense equipment, wherein the store or dispense equipment operates, at least in part, according to the instruction set.

2. The method of claim 1, wherein the demand data includes information associated with products dispensed from the store or dispense equipment.

3. The method of claim 1, wherein retrieving demand data includes retrieving sales information provided by a sensor of the store or dispense equipment.

4. The method of claim 1, wherein loading the instruction set includes loading the instruction set onto a retrofit audit device associated with the store or dispense equipment.

5. The method of claim 4, further comprising generating instructions by the retrofit audit device and transmitting the instructions to a controller of the store or dispense equipment, wherein the instructions are based at least in part on the loaded instruction set.

6. The method of claim 1, wherein preparing an instruction set includes preparing the instruction set that specifies one or more user-settable options of the store or dispense equipment.

7. The method of claim 1, wherein retrieving demand data includes retrieving information provided by a motion sensor of the store or dispense equipment.

8. The method of claim 1, wherein retrieving demand data includes retrieving demand data directly from a controller of the store or dispense equipment using the at least one portable device.

9. The method of claim 1, wherein loading the instruction set includes loading the instruction set from the at least one portable device into a controller of the store or dispense equipment.

10. The method of claim 1, wherein at least one of the predetermined modes of operation includes at least one of a normal mode, a standby mode, or a storage mode for at least one component of the store or dispense equipment.

11. The method of claim 1, wherein at least one of the predetermined modes of operation includes at least one temperature for at least one component of the store or dispense equipment.

12. The method of claim 1, wherein the at least one component of the store or dispense equipment includes one or more of lighting equipment, a refrigeration system component, a controller, or a heating system component of the store or dispense equipment.

13. The method of claim 12, wherein the store or dispense equipment component includes one or more of a compressor fan or an evaporator fan.

14. The method of claim 1, wherein at least one of the predetermined modes of operation specifies a display of at least one media presentation during at least one of the predetermined time periods.

15. The method of claim 14, wherein the media presentation is associated with an advertisement.

16. The method of claim 1, wherein at least one of the predetermined modes of operation specifies a reverse mode of operation or configuration for a condenser fan for at least one of the predetermined time periods.

17. The method of claim 1, wherein the at least one component of the store or dispense equipment includes a condenser fan and a compressor, wherein the identified operating template specifies predetermined modes of operation for at least one of the condenser fan or the compressor, and wherein a reverse mode of operation for the condenser fan is independent of an operation of the compressor.

18. The method of claim 1, wherein the instruction set specifies a plurality of time periods and a plurality of prices for the time periods, wherein at least two prices are associated with at least one product of the store or dispense equipment.

19. The method of claim 1, wherein the at least one portable device includes at least a first portable device and a second portable device, wherein the first portable device retrieves the demand data from the store or dispense equipment, and wherein the second portable device loads the instructions onto the store or dispense equipment.

20. The method of claim 1, wherein preparing the instruction set further comprises modifying at least one mode of operation for at least one time period in the identified operating template according to input from at least one of a merchant-owner, a route supervisor, or a bottler associated with the store or dispense equipment.

21. The method of claim 20, wherein the input is associated with operational hours of a location of the store or dispense equipment.

22. The method of claim 1, wherein the store or dispense equipment comprises a vending machine.

23. A system for providing energy management for store or dispense equipment, comprising:
   at least one store or dispense equipment, wherein the at least one store or dispense equipment stores demand data for products provided by the at least one store or dispense equipment;
   at least one portable device that retrieves the demand data from the at least one store or dispense equipment; and
   a processing center remote from the at least one store or dispense equipment, the processing center comprising one or more computers, wherein the processing center is operative to:
      obtain the demand data from the at least one portable device;
      generate an instruction set by at least identifying an operating template from a plurality of operating templates, wherein the operating template is identified from the plurality of operating templates based upon the identified operating template being a closest match for the obtained demand data, the identified operating template specifying predetermined time periods and corresponding predetermined modes of operation for at least one component of the at least one store or dispense equipment during the predetermined time periods; and
      deliver the generated instruction set to the at least one portable device, wherein the at least one portable device is utilized to load the instruction set onto the at least one store or dispense equipment, wherein the at least one store or dispense equipment operates, at least in part, according to the instruction set.

24. The system of claim 23, wherein the at least one component includes at least one of lighting equipment, a refrigeration system component, vending machine controller, or a heating system component.

25. The system of claim 23, further comprising an override switch or manual mode for the at least one store or dispense equipment, wherein the override switch or manual mode supersedes one or more specifications of the instruction set.

26. The system of claim 23, wherein the instruction set specifies one or more user-settable options of the at least one store or dispense equipment.

27. The system of claim 23, wherein at least one of the predetermined modes of operation specifies a display of at least one media presentation during at least one of the predetermined time periods.

28. The system of claim 27, wherein the media presentation is associated with an advertisement.

29. The system of claim 23, wherein at least one of the predetermined modes of operation includes at least one temperature for at least one component of the store or dispense equipment.

30. The system of claim 23, wherein the instruction set specifies a plurality of time periods and a plurality of prices for the time periods, wherein at least two prices are associated with at least one product of the store or dispense equipment.

31. The system of claim 23, wherein the at least one portable device includes at least a first portable device and a second portable device, wherein the first portable device retrieves the demand data from the store or dispense equipment, and wherein the second portable device loads the instructions onto the at least one store or dispense equipment.

32. The system of claim 23, wherein the instruction set is generated by further modifying at least one mode of operation for at least one time period in the identified operating template according to input from at least one of a merchant-owner, a route supervisor, or a bottler associated with the store or dispense equipment.

33. The system of claim 32, wherein the input is associated with operational hours of a location of the store or dispense equipment.

34. The system of claim 23, wherein the at least one store or dispense equipment comprises at least one vending machine.

35. An apparatus configurable for energy management, comprising:
   a processor, wherein the processor executes control instructions for controlling operations of one or more electrical components of a store or dispense equipment;
   a first memory in communication with the processor for storing demand data associated with the store or dispense equipment;
   a first communication module for providing the demand data to at least one portable device, wherein a processing center comprising one or more computers obtains the demand data from the at least one portable device and generates an instruction set by at least identifying an operating template from a plurality of operating templates, wherein the operating template is identified from the plurality of operating templates based upon the identified operating template being a closest match for the obtained demand data, the identified operating template specifying predetermined time periods and corresponding predetermined modes of operation for at least one component of the store or dispense equipment during the predetermined time periods, wherein the generated instruction set is provided to the at least one portable device;
   a second communication module for receiving the instruction set from the at least one portable device based at least in part on the transmitted demand data;
   a second memory in communication with the processor for storing the received instruction set; and
   an energy management agent module operative with the instruction set to provide control instructions to the processor for execution.

36. The apparatus of claim 35, wherein the instruction set specifies one or more user-settable options of the store or dispense equipment.

37. The apparatus of claim 35, wherein the one or more electrical components includes one or more of lighting equipment, refrigeration equipment, or heating equipment.

38. The apparatus of claim 35, wherein at least one of the predetermined modes of operation specifies a display of at least one media presentation during at least one of the predetermined time periods.

39. The apparatus of claim 38, wherein the media presentation is associated with an advertisement.

40. The apparatus of claim 35, wherein the first communication module and the second communication module are provided by a single module.

41. The apparatus of claim 35, wherein at least one of the predetermined modes of operation includes at least one temperature for at least one component of the store or dispense equipment.

42. The apparatus of claim 35, wherein the instruction set specifies a plurality of time periods and a plurality of prices for the time periods, wherein at least two prices are associated with at least one product of the store or dispense equipment.

43. The apparatus of claim 35, wherein the at least one portable device includes at least a first portable device and a second portable device, wherein the first communication module provides the demand data to the first portable device, and wherein the second communication module receives the instruction set from the second portable device.

44. The apparatus of claim 35, wherein the instruction set is generated by further modifying at least one mode of operation for at least one time period in the identified operating template according to input from at least one of a merchant-owner, a route supervisor, or a bottler associated with the store or dispense equipment.

45. The apparatus of claim 44, wherein the input is associated with operational hours of a location of the store or dispense equipment.

46. The apparatus of claim 35, wherein the at least one store or dispense equipment includes a vending machine.

47. The apparatus of claim 35, wherein the first memory and the second memory are a same memory.

48. A system for providing energy management for store or dispense equipment, comprising:
    a store or dispense equipment, wherein the store or dispense equipment stores demand data for products provided by the store or dispense equipment; and
    a processing center comprising one or more computers, wherein the processing center is operative to:
        receive the stored demand data to identify time periods for energy conservation; and
        select a predetermined operating template from a plurality of predetermined operating templates, wherein the selection of the operating template is based upon the selected operating template being a closest match for the received demand data, the selected operating template specifying predetermined time periods and corresponding predetermined modes of operation for at least one component of the store or dispense equipment during the predetermined time periods, wherein the selected operating template is loaded onto the store or dispense equipment, and wherein the store or dispense equipment operates, at least in part, according to the selected operating template,
    wherein the processing center is further operative to modify at least one mode of operation for at least one time period in the identified operating template according to input from at least one of a merchant-owner, a route supervisor, or a bottler associated with the store or dispense equipment, wherein the modified operating template is loaded onto the store or dispense equipment,
    wherein the input is associated with operational hours of a location of the store or dispense equipment.

* * * * *